US008215529B2

(12) United States Patent
Wu

(10) Patent No.: US 8,215,529 B2
(45) Date of Patent: Jul. 10, 2012

(54) PNEUMATIC DEVICE

(75) Inventor: I-Tsung Wu, Taipei (TW)

(73) Assignee: De Poan Pneumatic Corp. (TW)

( * ) Notice: Subject to any disclaimer, the term of this patent is extended or adjusted under 35 U.S.C. 154(b) by 304 days.

(21) Appl. No.: 12/790,897

(22) Filed: May 31, 2010

(65) Prior Publication Data

US 2011/0290850 A1 Dec. 1, 2011

(51) Int. Cl.
*B25C 5/02* (2006.01)
*B25C 1/04* (2006.01)
*B25C 5/06* (2006.01)
*B23Q 5/00* (2006.01)

(52) U.S. Cl. ............................................ 227/130; 173/9

(58) Field of Classification Search .......... 227/129–139; 173/9, 177

See application file for complete search history.

(56) References Cited

U.S. PATENT DOCUMENTS 4,384,623 A * 5/1983 Galloni ......................... 173/127
4,549,344 A * 10/1985 Nikolich ......................... 29/432
6,854,631 B2 * 2/2005 Burke et al. .................. 227/130
7,013,985 B2 * 3/2006 Sasaki et al. ..................... 173/11
7,293,684 B1 * 11/2007 Wen .............................. 227/130
7,296,721 B1 * 11/2007 Wen .............................. 227/130
7,448,524 B1 * 11/2008 Liang et al. ................... 227/130
7,677,426 B2 * 3/2010 Tillinghast et al. ........... 227/130
7,762,443 B2 * 7/2010 Tamura et al. .................. 227/10
2005/0156008 A1 * 7/2005 Komazaki et al. .............. 227/10
2006/0196682 A1 * 9/2006 McGee et al. ..................... 173/1
2007/0175942 A1 * 8/2007 Burke et al. ....................... 227/8
2007/0194075 A1 * 8/2007 Tanaka et al. ...................... 227/8
2008/0029566 A1 * 2/2008 Shkolnikov et al. ............ 227/10
2010/0140314 A1 * 6/2010 Tillinghast et al. ............... 227/8
2011/0198380 A1 * 8/2011 Kitagawa et al. ................. 227/2

* cited by examiner

*Primary Examiner* — Robert Long

(57) ABSTRACT

An improved pneumatic device includes a body having a hollow cavity, defining an X axis and having a first end and a second end. The body includes a movable cylinder, a nail-firing piston rod and at least one exhaust hole. The movable cylinder and the nail-firing piston rod reciprocate along the X axis in the body by performing a forward stroke to the second end, and a return stroke back to the first end. The movable cylinder presents an open status when completing the forward stroke and presents a closed status when completing the return stroke. The movable cylinder has an exhaust hole and an exhaust valve disposed at an outer periphery thereof. When the nail-firing piston rod has not completed the return stroke yet and the cylinder is in the closed status, an exhaust channel is thereby formed to facilitate exhausting of air.

5 Claims, 21 Drawing Sheets

PNEUMATIC DEVICE

BACKGROUND OF THE INVENTION

1. Technical Field

The present invention relates to pneumatic devices, and particularly to an improved pneumatic device with simple construction, small volume and a novel air channel and without loss of efficiency.

2. Description of Related Art

The environmental protection concepts and corresponding practical actions have been practiced for many years. Correspondingly, energy resources have evolved from the early forms of steam power, thermal power and hydropower to the modern forms of electric power, solar energy and pneumatic power which feature higher efficiency. All of these energy source forms reveal that, with rapid development of the science and technology, it is possible to use different energy sources or composite energy sources for various appropriate purposes. However, some energy sources cannot be obtained without a lot of cost or without damage to the ecosystem on the earth (e.g., the nuclear energy and the thermal power), so they are only restricted to use in some large-scale industrial purposes or general life sectors; on the other hand, other energy sources unsuitable for use by many users on a large scale (e.g., solar energy and pneumatic power) are widely used by single users or a few collective users.

A typical energy source that is widely used by single users or a few collective users in recent years is the pneumatic power. Pneumatic tools are known as one application of the pneumatic power. Examples of the pneumatic tools include pneumatic wrenches for detaching nuts of tires, pneumatic nail guns, pneumatic glue applicators and the like. These are all inexpensive and highly efficient pneumatic energy sources that are suitable for use by single users in daily life. In order to make efficient use of these cheap energy sources, the tools by means of which the pneumatic sources are applied become very important.

Furthermore, because of the economic depression, a lot of small works in families are now mostly carried out by family members themselves in order to eliminate the high expense of employing professionals. This is especially the case in America which is affected the most by the Financial Tsunami in recent years. The labor cost of employing professionals in America is relatively high, so for simple works, it is naturally the best choice for family members to accomplish such works by themselves in a simple and economic way. Of course, use of professional tools, e.g., building a house by using a pneumatic tool, is also undoubtedly a good choice to reduce the cost and increase the efficiency. Taking a case of building a house as an example, a spacing of 16 inches between individual beams is specified in construction specifications in America. Consequently, the length of current nail guns makes it inconvenient and difficult to work with such nail guns between two beams.

Referring to FIG. 16, there is shown a first front view of a movable-cylinder nail gun according to a first prior-art device. The movable-cylinder nail gun includes a gun body 1'; a downwards-movable cylinder 3' disposed in the gun body 1'; a piston 4' for firing nails that is disposed in the cylinder 3'; at least two airtight gaskets 41' and 42' disposed on the piston 4' to divide an interior of the cylinder 3' into a top cylinder chamber 31' and a bottom cylinder chamber 32'; a main air chamber 10' formed inside the gun body 1', which extends between a handle 11' of the gun body 1' and a periphery of the cylinder 3' to collect high-pressure air that is continuously supplied by an external source via a tail end of the handle 11' at a constant pressure; and a trigger valve 51' disposed at an end of the main air chamber 10' to be driven by a trigger 5' disposed on the gun body 1' so as to open and close a path between the main air chamber 10' of the handle 11' and a trigger air channel 17' in the gun body 1'.

Referring to FIG. 17, there is shown a second front view of the movable-cylinder nail gun according to the first prior-art device. The cylinder 3' is formed with a head valve 8' integrally at a top portion thereof. The head valve 8' has a main air-valve port 81' and an airtight ring 82' disposed thereon, and the gun body 1' has an annular ribbed wall 12' therein. Before the cylinder 3' moves downwards, the airtight ring 82' can cling closely to the annular ribbed wall 12' to close a path that communicates between the main air chamber 10' and the top cylinder chamber 31' through the main air-valve port 81'; and when the cylinder 3' moves downwards, the airtight ring 82' can disengage from the annular ribbed wall 12' to open the path. Moreover, the head valve 8' is formed with an annular rib 83' inside a top portion thereof. The gun body 1' has, disposed at a top portion thereof, a cushion 84' and at least one upper air vent 13' communicating with the outside atmosphere. The annular rib 83' on the head valve 8' can open a path between the upper air vent 13' and the top cylinder chamber 31' to drain the high-pressure air in the top cylinder chamber 31' before the cylinder 3' moves downwards, and abut against the cushion 84' to close the path when the cylinder 3' moves downwards.

As can be known from the above description, in the prior-art device as shown in FIG. 17, components on the right side such as the airtight ring 82', the main air-valve port 81', the upper air vent 13', the annular rib 83' and the head valve 8' all lead to in increase of the length thereof. This kind of design, plus the aforesaid restriction imposed by current regulations in America, not only restricts operations of users but also increases the manufacturing cost and consequently the price of the product, making the product less competitive in the market.

Furthermore, referring to FIGS. 18 to 20, there are shown a diagram of a fixed-cylinder nail gun according to a second prior-art device, an enlarged diagram of a portion of the fixed-cylinder nail gun according to the second prior-art device, and a diagram of the fixed-cylinder nail gun according to the second prior-art device in a pressurized and air escaping status respectively. As shown in FIG. 18, the fixed-cylinder nail gun mainly has a fixed cylinder 101, a piston 102, a valve housing 103, a main air chamber 104, a top cylinder chamber 105, an exhaust airlock 106 and an air vent 107. The valve housing 103 is disposed around the fixed cylinder 101 to control entry of the high-pressure air from the main air chamber 104 into the top cylinder chamber 105 to push the piston 102 for firing of a nail. Upon completion of firing the nail, i.e., in a return stroke of the piston 102 after firing the nail, the exhaust airlock 106 begins to exhaust the air. As shown in FIG. 19, as the valve housing 103 is closed, the main air chamber 104 and the top cylinder chamber 105 do not communicate with each other, and on the other hand, the exhaust airlock 106 has already been opened; therefore, this represents a status that the air in the top cylinder chamber 105 has been exhausted via the exhaust airlock 106 and the vent 107 when the return stroke of the piston 102 is completed. As shown in FIG. 20, i.e., when the operation shown in FIG. 18 is completed, the main air chamber 104 is filled with high-pressure air anew to force the valve housing 103 to open again so that the air enters into the top cylinder chamber 105 as shown by the dashed line in FIG. 20. However, because of the fast flow velocity of the air and because of the design, opening/closing of the valve housing 103 is partially overlapped in time with closing/opening of the exhaust airlock 106, so when the high-pressure air of the main air chamber 104 enters into the top cylinder chamber 105, a part of the air might escape via a gap W1 in the exhaust airlock 106 that has not been completely closed and via the air vent 107 as shown by the dashed line in FIG. 20, thereby decreasing the efficiency of pushing the piston 102.

For the second prior-art device described above, although the air exhausting structure thereof has been improved and shortened in length, the poor design still results in partial overlap in time between opening/closing of the valve housing and closing/opening of the exhaust airlock, leading to decrease in the efficiency of pushing the piston.

Accordingly, there is an urgent need in the art to design an improved pneumatic device with simple construction and small volume and without loss of efficiency so as to solve the problems confronted by the prior-art devices.

SUMMARY OF THE INVENTION

An objective of the present invention is to provide an improved pneumatic device with simple construction, small volume and a novel air channel and without loss of efficiency, so as to reduce its manufacturing cost and expand its application scope.

An improved pneumatic device of the present invention comprises a body, a handle and a trigger device.

The body, which has a hollow cavity, defines an X axis and has a first end and a second end. The body comprises: a movable cylinder disposed in the body being adapted to reciprocate along the X axis in the body and comprising an exhaust valve, an exhaust hole disposed near the first end, a one-way second ring valve, at least one vent hole and an annular rib; a nail-firing piston rod disposed in and coaxial with the movable cylinder being adapted to reciprocate along the X axis in the movable cylinder to divide an interior of the movable cylinder into a top cylinder chamber and a bottom cylinder chamber; a pair of buffer devices disposed near the first end of the body and near the second end of the body respectively, being adapted to buffer impulsive forces generated by the nail-firing piston rod when moving to the second end and when moving back to the first end; a main air chamber disposed at an inner periphery of the body and having an air channel; an exhaust hole disposed unparallel to the X axis and near the first end being adapted to form an exhaust channel together with the exhaust valve and the exhaust hole to facilitate exhausting of air when the nail-firing piston rod moves back to the first end; an upper air chamber disposed at the inner periphery of the body; a middle air chamber disposed at the inner periphery of the body; and a return air chamber disposed at the inner periphery of the body and near the second end being adapted to store high-pressure air which enters into the return air chamber through the second ring valve when the nail-firing piston rod has moved to the second end but has not started to move to the first end. The annular rib is disposed between the upper air chamber and the middle air chamber.

The handle, which has a hollow cavity, defines a Y axis and is connected to the body in an orientation approximately perpendicular to the X axis of the body.

The trigger device is disposed near the handle. When the trigger device is depressed, the high-pressure air inside the handle flows into the upper air chamber through the trigger device and the air channel.

When the trigger device is depressed and then released, the high-pressure air inside the handle flows through the trigger device, the air channel, the upper air chamber, the top cylinder chamber, the second ring valve, the return air chamber, the vent holes, the bottom cylinder chamber, the exhaust hole and the trigger device to drive the movable cylinder and the nail-firing piston rod to reciprocate.

Advantages and spirits of the present invention can be further understood from the following detailed description and the attached drawings. However, the attached drawings are only provided for illustration purpose rather than to limit the scope of the present invention.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

Figure 1:
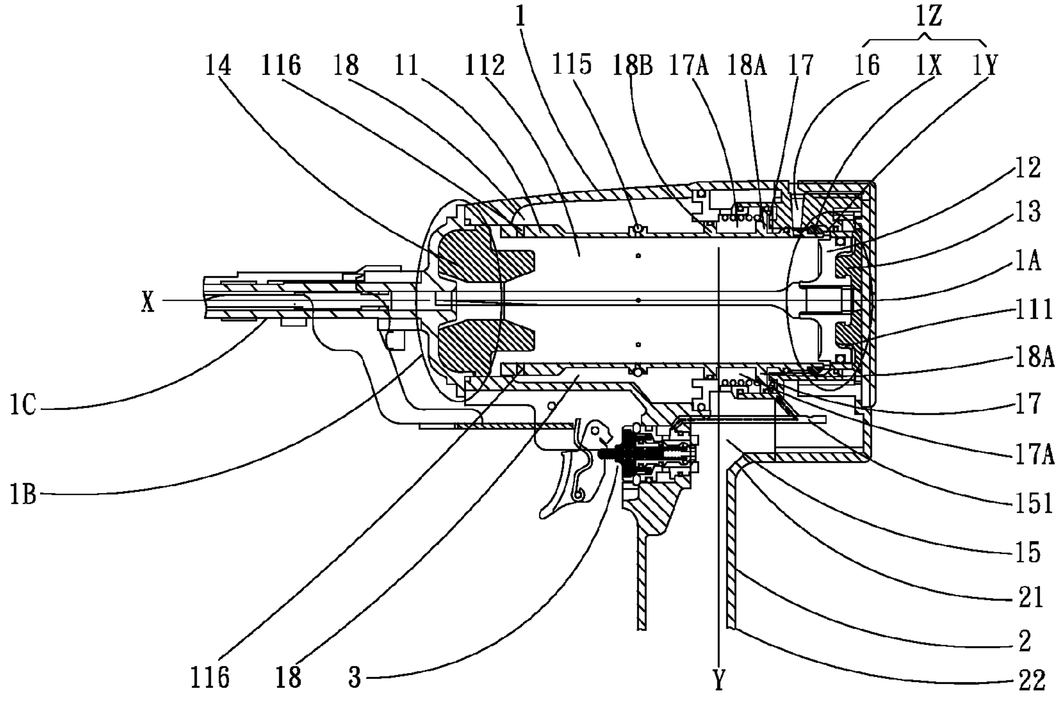
FIG. 1 is a front view of a preferred embodiment of an improved pneumatic device according to the present invention.

Hereinafter, a preferred embodiment of the present invention will be described in detail with reference to the attached drawings. Referring to FIG. 1, there is shown a front view of the preferred embodiment of an improved pneumatic device according to the present invention. The improved pneumatic device includes a body 1, a handle 2, a trigger device 3 and a tubular part 1C.

The body 1, which has a hollow cavity, defines an X axis and has a first end 1A and a second end 1B. The body 1 includes a movable cylinder 11, a nail-firing piston rod 12, a pair of buffer devices 13, 14, a plurality of air path structures and a return air chamber 18.

The movable cylinder 11 is disposed in the body 1 and adapted to reciprocate along the X axis in the body 1. The reciprocating movement includes a forward stroke from the first end 1A to the second end 1B, and a return stroke from the second end 1B back to the first end 1A. The position of the first end 1A is a starting position for each movement cycle of the movable cylinder 11, while the position of the second end 1B is a middle position of the whole cycle. Between an outer surface of the movable cylinder 11 and an inner surface of the hollow cavity of the body 1 are provided an exhaust valve 1X (referring to FIG. 9A) disposed near the first end 1A, an exhaust hole 1Y (referring to FIG. 9A) disposed near the first end 1A, a one-way second ring valve 115 disposed at a half-way position between the first end 1A and the second end 1B, two vent holes 116 disposed near the second end 1B and two annular ribs 18A, 18B.

The nail-firing piston rod 12 is disposed in and coaxial with the movable cylinder 11, and is adapted to reciprocate along the X axis in the movable cylinder 11 to divide an interior of the movable cylinder 11 into a top cylinder chamber 111 and a bottom cylinder chamber 112. The reciprocating movement includes a forward stroke from the first end 1A to the second end 1B, and a return stroke from the second end 1B back to the first end 1A.

The pair of buffer devices 13, 14 are disposed in the movable cylinder 11 near the first end 1A of the body 1 and near the second end 1B of the body 1 respectively to buffer impulsive forces generated by the nail-firing piston rod 12 when moving to the second end 1B and when moving back to the first end 1A.

The plurality of air path structures further includes a main air chamber 15, an exhaust hole 16, an upper air chamber 17 and a middle air chamber 17A. The main air chamber 15 is disposed at an inner periphery of the body 1 and has an air channel 151. The exhaust hole 16 is non-perpendicular to the X axis and disposed near the first end 1A to facilitate exhausting of air when the nail-firing piston rod 12 moves back to the first end 1A; i.e., the air is exhausted through an exhaust channel 1Z formed by the exhaust hole 16, the exhaust valve 1X and the exhaust hole 1Y. The upper air chamber 17 is disposed at the inner periphery of the body 1. The middle air chamber 17A is disposed at the inner periphery of the body 1. The middle air chamber 17A communicates with the main air chamber 15.

The return air chamber 18 is disposed at the inner periphery of the body 1 and near the second end 1B, and is adapted to store high-pressure air which enters into the return air chamber 18 through the second ring valve 115 when the nail-firing piston rod 12 has moved to the second end 1B but has not started to move towards the first end 1A. The annular rib 18A is disposed between the upper air chamber 17 and the middle air chamber 17A.

The handle 2, which has a hollow cavity, defines a Y axis and is connected to the body 1 at an orientation approximately perpendicular to the X axis of the body 1. A first end 21 of the handle 2 that connects to the body 1 communicates with the main air chamber 15. A second end 22 of the handle 2 that is opposite to the first end 21 is provided with a high-pressure pipe connection (not shown), which is adapted to connect to a high-pressure pipe to fill the hollow cavity with high-pressure air.

The trigger device 3 is disposed near the handle 2 and at a side opposite to the main air chamber 15 with respect to the Y axis of the handle 2. When the trigger device 3 is depressed, the high-pressure air inside the handle 2 flows into the upper air chamber 17 through the trigger device 3 and the air channel 151.

The tubular part 1C is disposed on the outside of the second end 1B of the body 1 and coaxial with the movable cylinder 11. In this preferred embodiment, the tubular part 1C is a barrel of a nail gun. When the trigger device 3 is depressed and then released, the high-pressure air inside the handle 2 flows through the trigger device 3, the air channel 151, the upper air chamber 17, the top cylinder chamber 111, the second ring valve 115, the return air chamber 18, the vent holes 116, the bottom cylinder chamber 112, the exhaust hole 16 and the trigger device 3 to drive the movable cylinder 11 and the nail-firing piston rod 12 to reciprocate.

Figure 2:
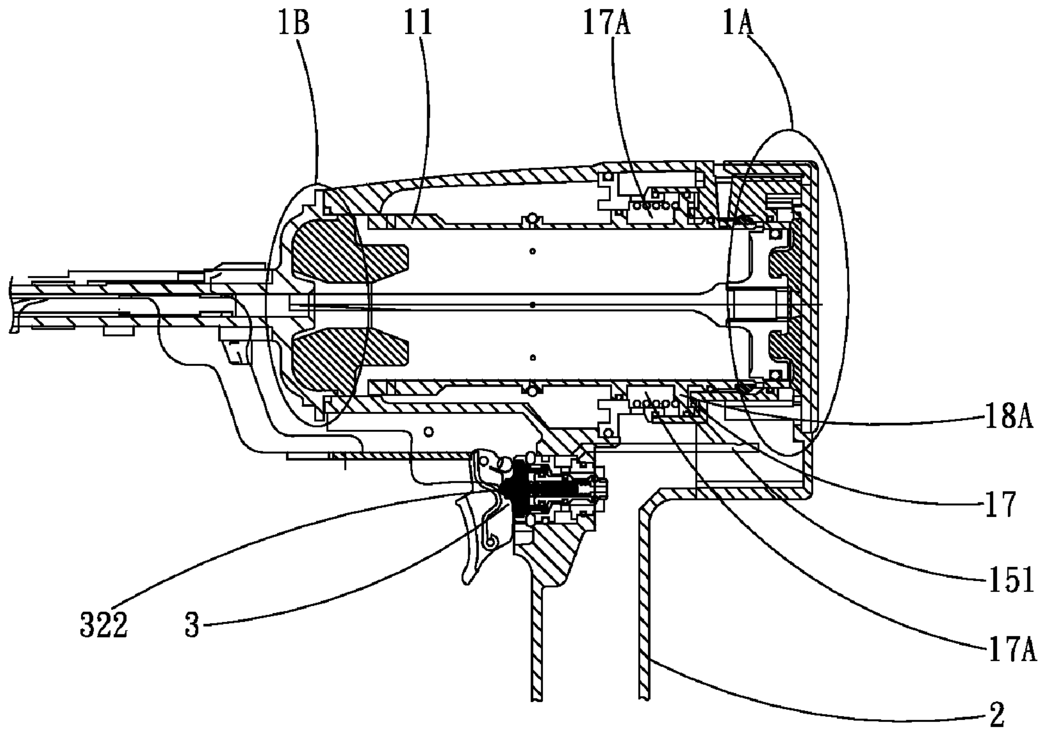
FIGS. 2~9 are diagrams of consecutive actions illustrating interactive relationships between individual components of the pneumatic device when a trigger device is depressed according to the preferred embodiment of the improved pneumatic device of the present invention.
Figure 3:
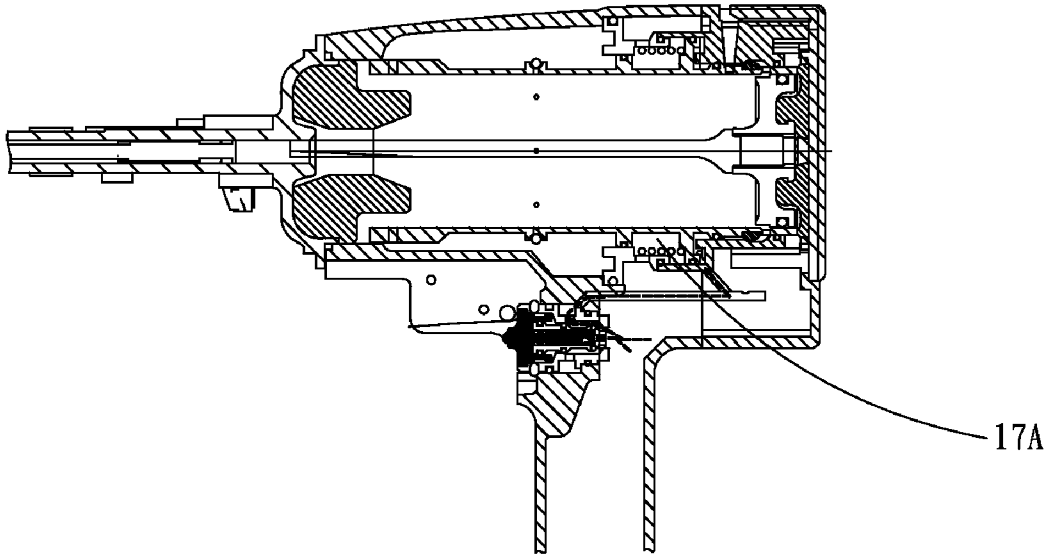
Figure 4:
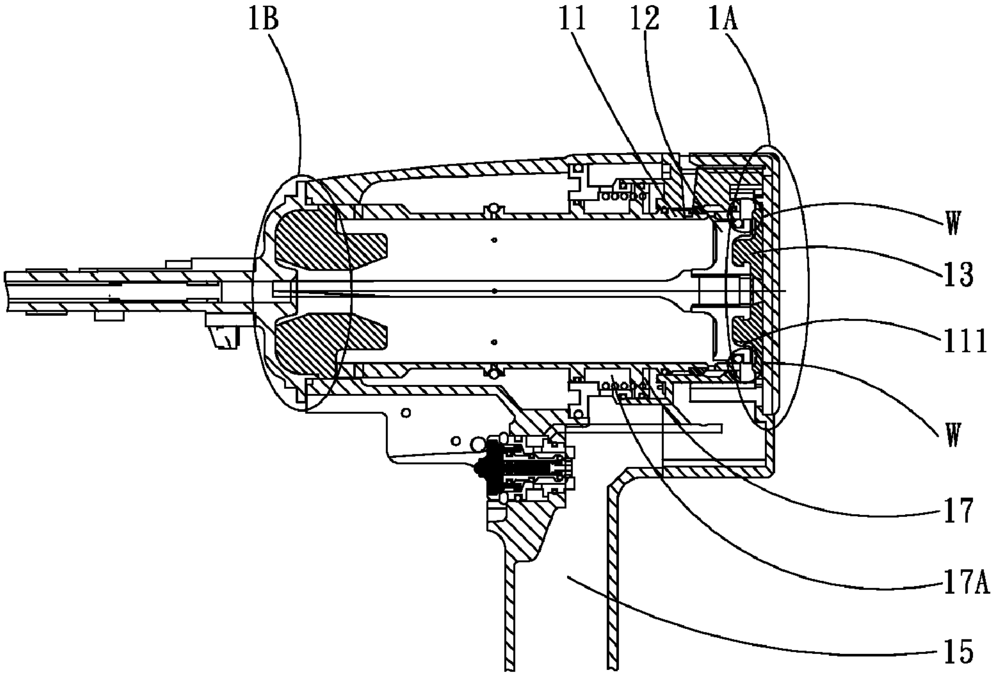
Figure 5:
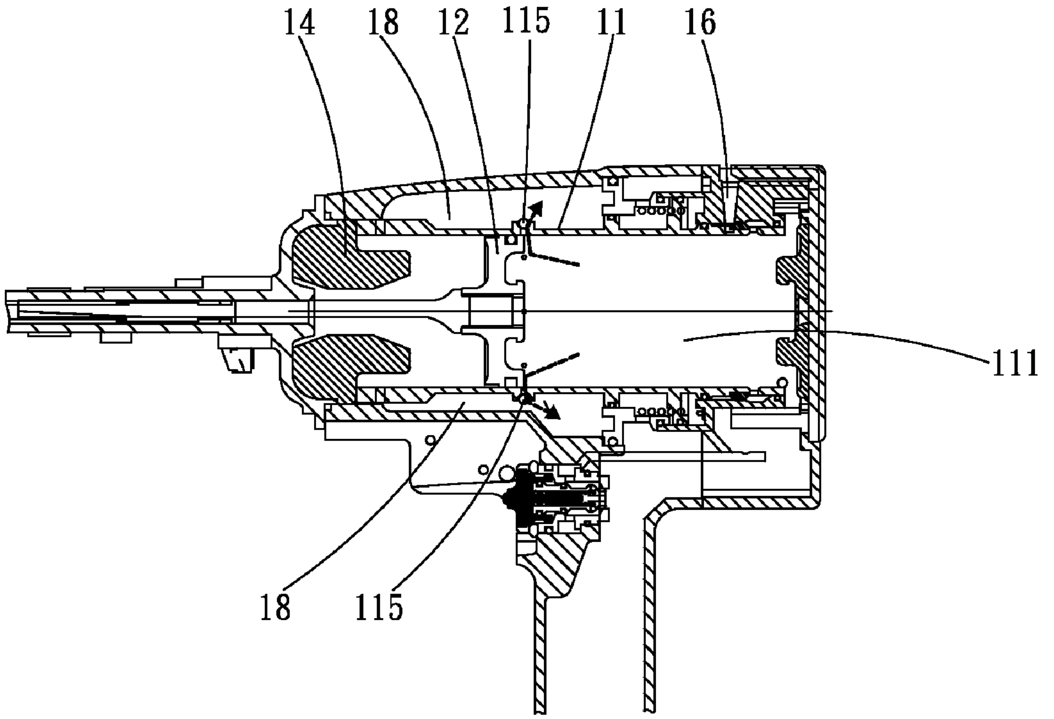
Figure 6:
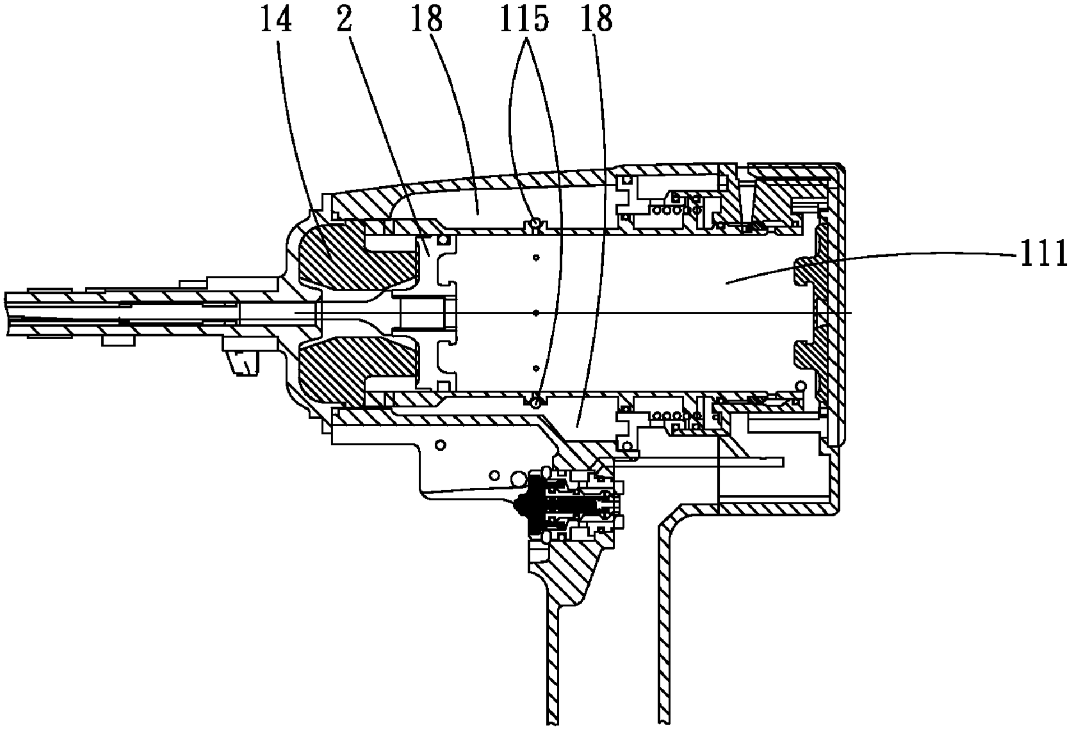
Figure 7:
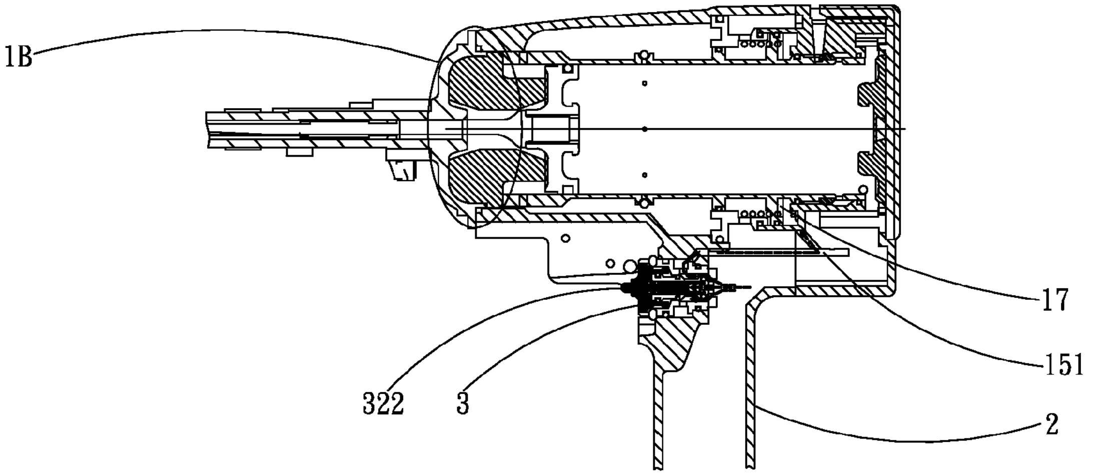
Figure 8:
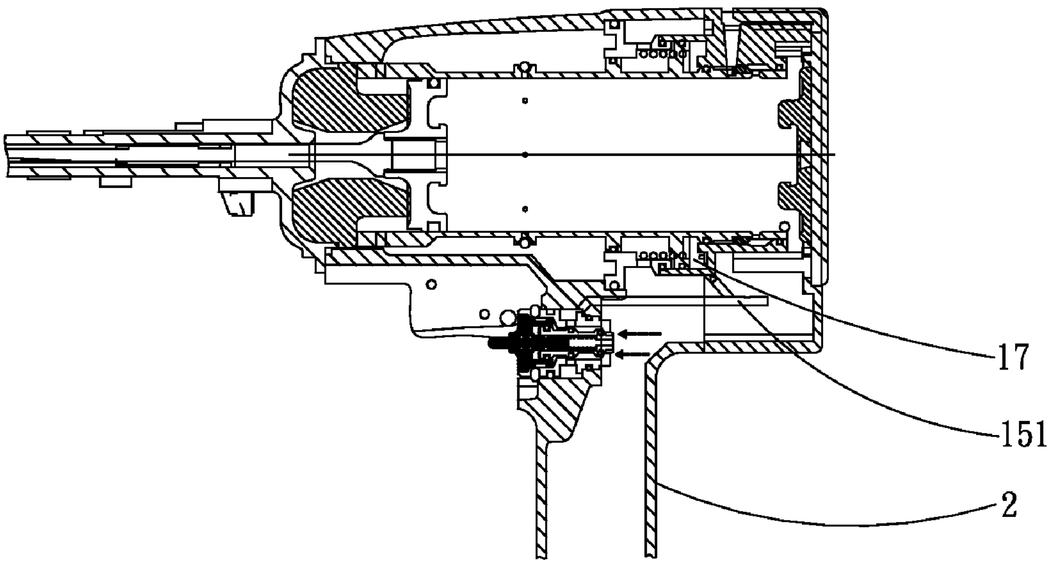
Figure 9:
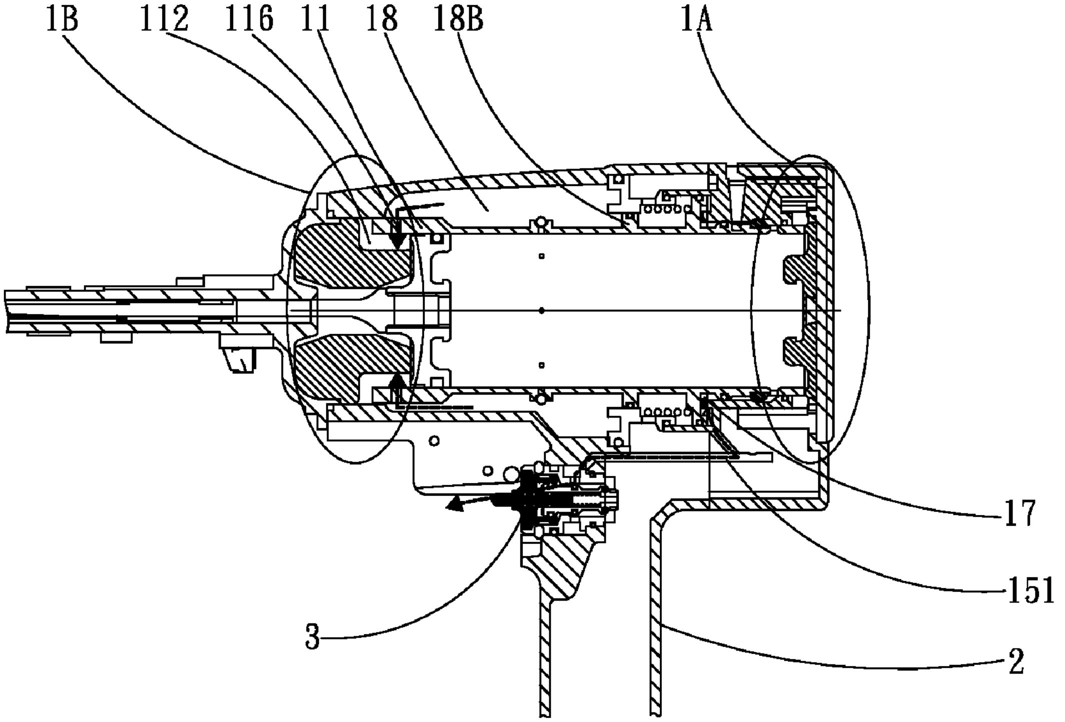
Figure 9A:
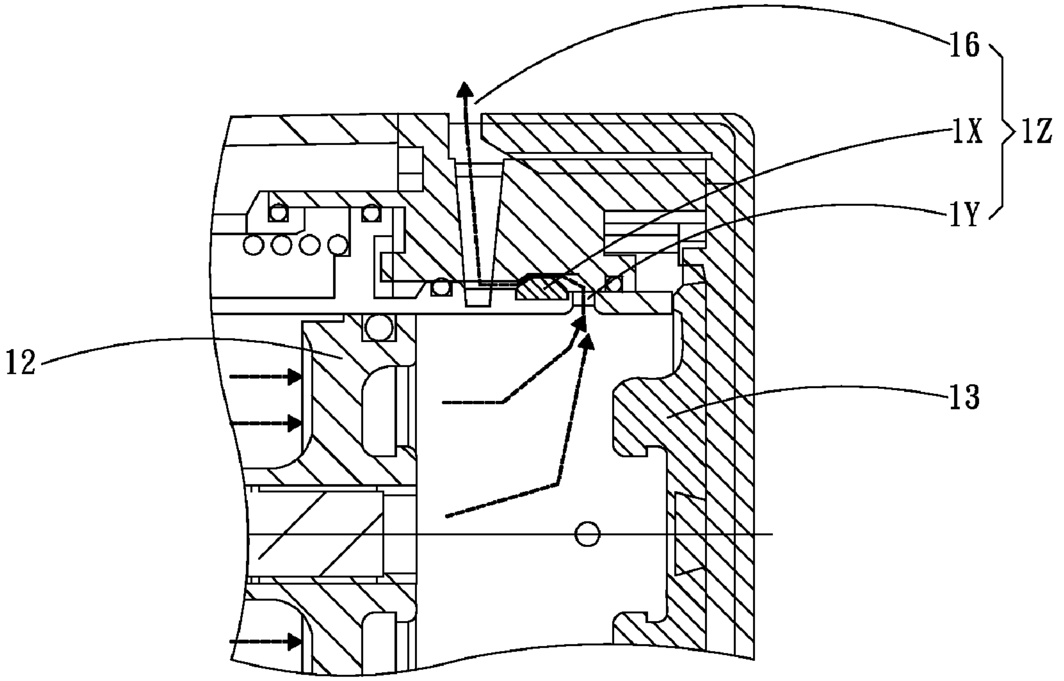
FIG. 9A is a diagram illustrating how the air of a top cylinder chamber is exhausted when a piston has not completed a return stroke yet and a cylinder is in a closed status.

FIGS. 2 to 9 are diagrams of consecutive actions illustrating interactive relationships between individual components of the pneumatic device when the trigger device is depressed according to the preferred embodiment of the improved pneumatic device of the present invention. As shown in FIGS. 2 and 3, when the trigger device 3 is depressed, i.e., when an end 322 of the trigger device 3 moves towards the first end 1A, the high-pressure air inside the handle 2 enters into the air channel 151 through the trigger device 3 to fill in the upper air chamber 17 (the flow path of the air is as shown by the dashed lines in FIG. 3). When the pressure builds up to a predetermined value, the annular rib 18A will be pressed by the high-pressure air inside the upper air chamber 17 to move towards the second end 1B; i.e., the cylinder 11 starts to move from the first end 1A of the body 1 towards the second end 1B of the body 1. As shown in FIG. 4, the cylinder presents an open status; i.e., a gap W exists between the cylinder 11 and the first end 1A. The high-pressure air in the main air chamber 15 then enters into the top cylinder chamber 111 between the nail-firing piston rod 12 and the buffer device 13 via the gap W to push the nail-firing piston rod 12 to move from the first end 1A towards the second end 1B. As shown in FIG. 5, when the nail-firing piston rod 12 moves through the position of the second ring valve 115, the high-pressure air enters into the return air chamber 18 through the one-way second ring valve 115 along a path as shown by the dashed lines in FIG. 5. Then, air pressure builds up gradually in the return air chamber 18 while the nail-firing piston rod 12 continues to move towards the buffer device 14. As shown in FIG. 6, at this moment, volume of the top cylinder chamber 111 has evolved to the greatest extent, making it impossible for the high-pressure air to enter into the return air chamber 18 through the second ring valve 115 any more. Furthermore, as shown in FIGS. 7 and 8, when the trigger device 3 is released, i.e., when the end 322 of the trigger device 3 moves towards the second end 1B, cooperation of individual components of the trigger device 3 (to be described in detail hereinafter) inhibits communication of the interior of the handle 2 with the upper air chamber 17 and the air channel 151, but the cylinder is still in the open status. Specifically, in FIG. 7, the interior of the handle 2 still communicates with the upper air chamber 17 and the air channel 151, as shown by the dashed lines. However, in FIG. 8, the interior of the handle 2 no longer communicates with the upper air chamber 17 and the air channel 151, as shown by the dashed lines. As shown in FIG. 9, as the high-pressure air from the handle 2 no longer enters into the upper air chamber 17, no high-pressure air exists in the upper air chamber 17; and on the other hand, the air pressure in the return air chamber 18 has built up to a certain extent. Then, the pressure in the return air chamber 18 will force the annular rib 18B and the pressure in the middle air chamber 17A will force the annular rib 18A to move towards the first end 1A; i.e., the cylinder 11 starts to move from the second end 1B of the body 1 toward the first end 1A of the body 1 to close the cylinder. As a result of this movement, the return air chamber 18 can now communicate with the bottom cylinder chamber 112 through the vent hole 116. Consequently, the high-pressure air in the return air chamber 18 enters into the bottom cylinder chamber 112 through the vent hole 116, while residual air in the upper air chamber 17 is discharged to the atmosphere through the air channel 151 and another outlet (not shown) of the trigger device 3, with the two air channels being shown by dashed arrows. Please refer to FIG. 1 and FIG. 9A together, wherein FIG. 9A is a diagram illustrating how the air of the top cylinder chamber is exhausted when the piston has not completed a return stroke yet and the cylinder is in the closed status. In this case, the nail-firing piston rod 12 will move from the second end 1B to the first end 1A in a speedy way, and the air inside the top cylinder chamber 111 whose volume diminishes gradually is discharged through the internal structure of the body 1 and the exhaust hole 16 to the atmosphere. That is, when the nail-firing piston rod 12 has not completed the return stroke yet and the cylinder is in the closed status, the movable cylinder 11 close to the exhaust valve 1X and the exhaust hole 1Y near the first end 1A will communicate with the exhaust hole 16 disposed adjacent to the first end 1A and unparallel to the X axis to form the exhaust channel 1Z for discharging of the air. Thus, the forward stroke and the return stroke are completed.

Figure 10:
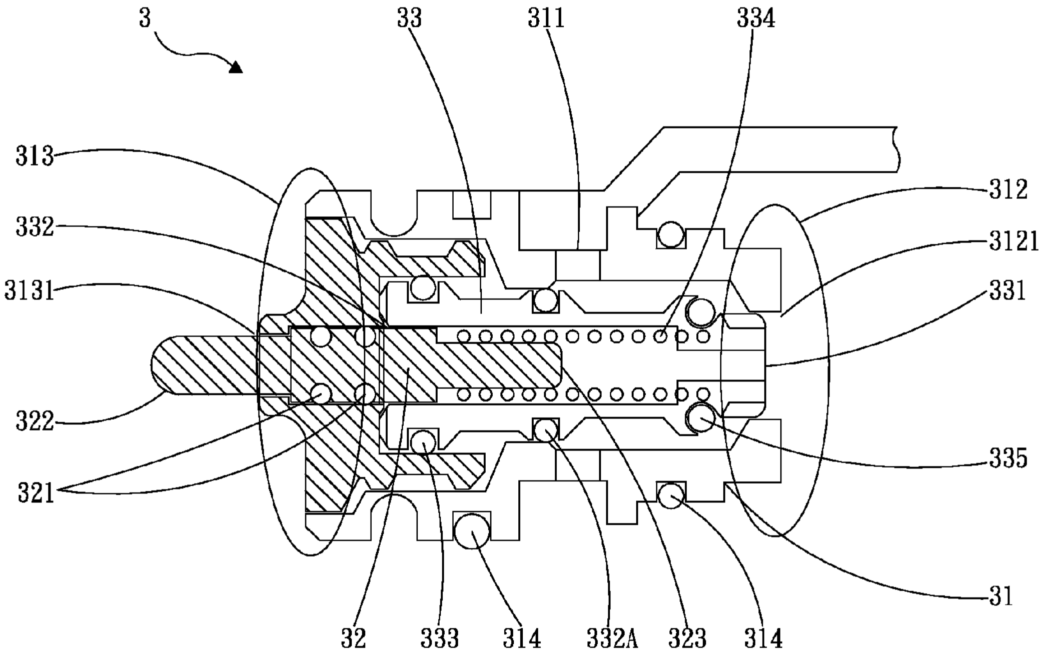
FIG. 10 is a diagram of the trigger device of the improved pneumatic device according to the present invention.

Referring to FIG. 10, there is shown a diagram of the trigger device of the improved pneumatic device according to the present invention. The trigger device 3 includes an enclosure 31, a trigger axle 32 and a trigger valve 33.

The enclosure 31 has a hollow cavity, and includes a plurality of airtight gaskets 314 and one side hole 311 for high-pressure air to flow into and out of the enclosure 31. The enclosure 31 includes a first end 312 and a second end 313, directions of which correspond to those of the first end 1A and the second end 1B of the body 1 respectively. Moreover, the first end 312 and the second end 313 of the enclosure 31 have a first opening 3121 and a second opening 3131, respectively.

The trigger axle 32, which is axially accommodated in the enclosure 31, has an end 322 and two airtight gaskets 321. The end 322 partially protrudes out of and is capable of retracting into and extending out of the second opening 3131 of the enclosure 31.

The trigger valve 33, which is axially accommodated in the enclosure 31, has a hollow cavity and includes a first opening 331, a second opening 332 and a return spring 334. The trigger axle 32 is accommodated into the trigger valve 33 through the second opening 332 and is coaxial with the trigger valve 33. The trigger valve 33 has a plurality of ring valves 335, 332A, 333 on an outer surface thereof. The trigger valve 33 partially protrudes out of and is capable of retracting into and extending out of the first opening 3121 of the enclosure 31. The first opening 331 is provided for high-pressure air to flow therethrough. The return spring 334 is disposed around an end 323 of the trigger axle 32 opposite to the end that protrudes out of the second opening 3131 of the enclosure 31, and abuts against an inner surface of the trigger valve 33 to assist in returning of the trigger axle 32 after being partially retracted into the trigger valve 33. Here, through cooperation of the enclosure 31, the trigger axle 32 and the trigger valve 33 in the piston movement, the open status and the subsequent closed status of the cylinder are generated in the body 1 to accomplish the reciprocating movement of the movable cylinder 11 and the nail-firing piston rod 12.

Figure 11:
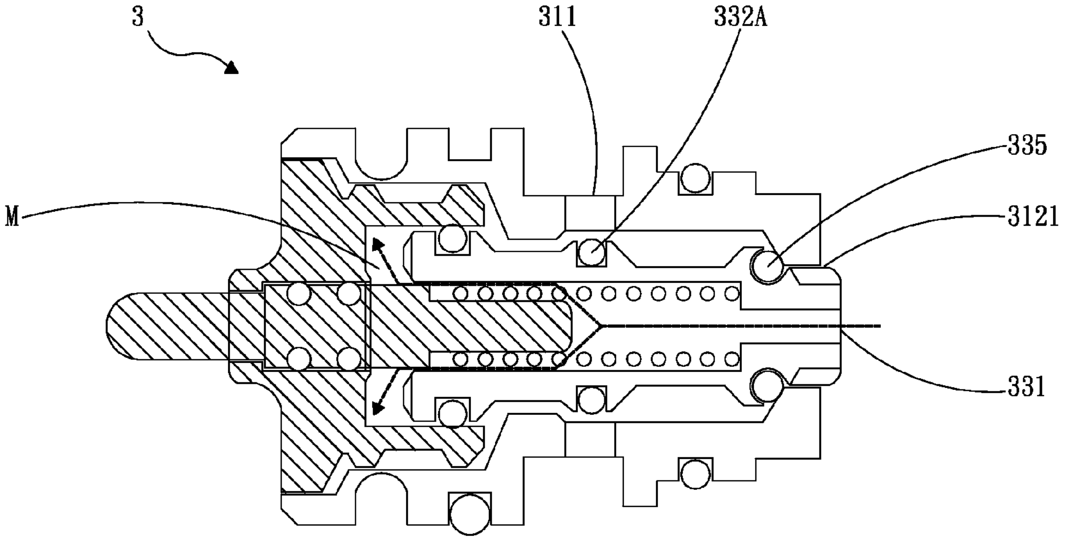
FIGS. 11 to 15 are diagrams of consecutive actions illustrating interactive relationships between individual components of the trigger device when a trigger axle is depressed according to the preferred embodiment of the improved pneumatic device of the present invention.
Figure 12:
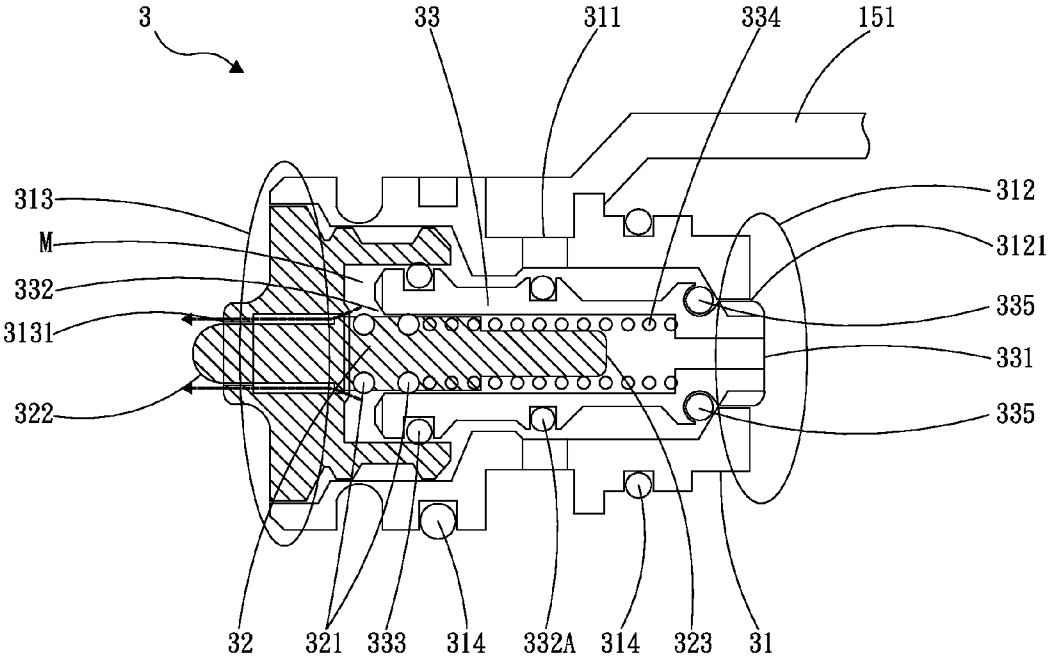
Figure 13:
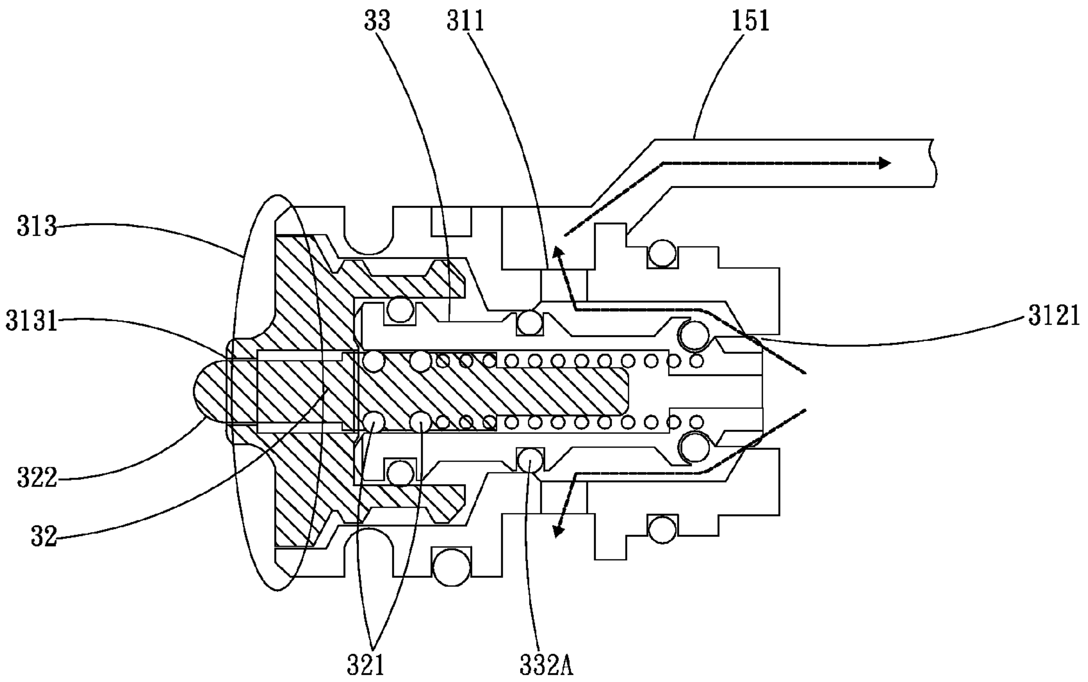
Figure 14:
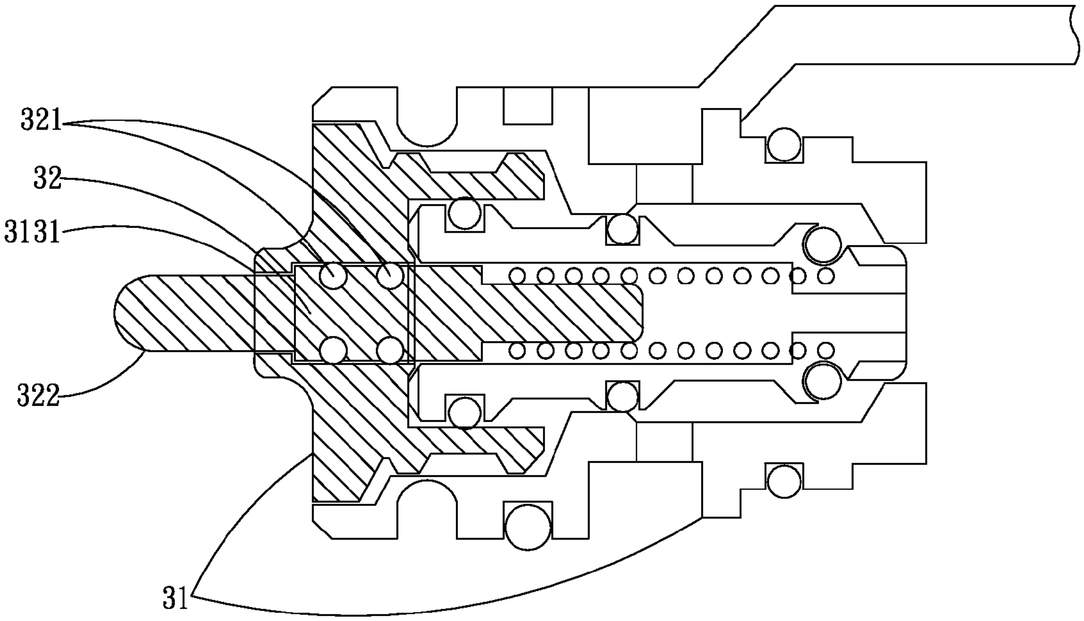
Figure 15:
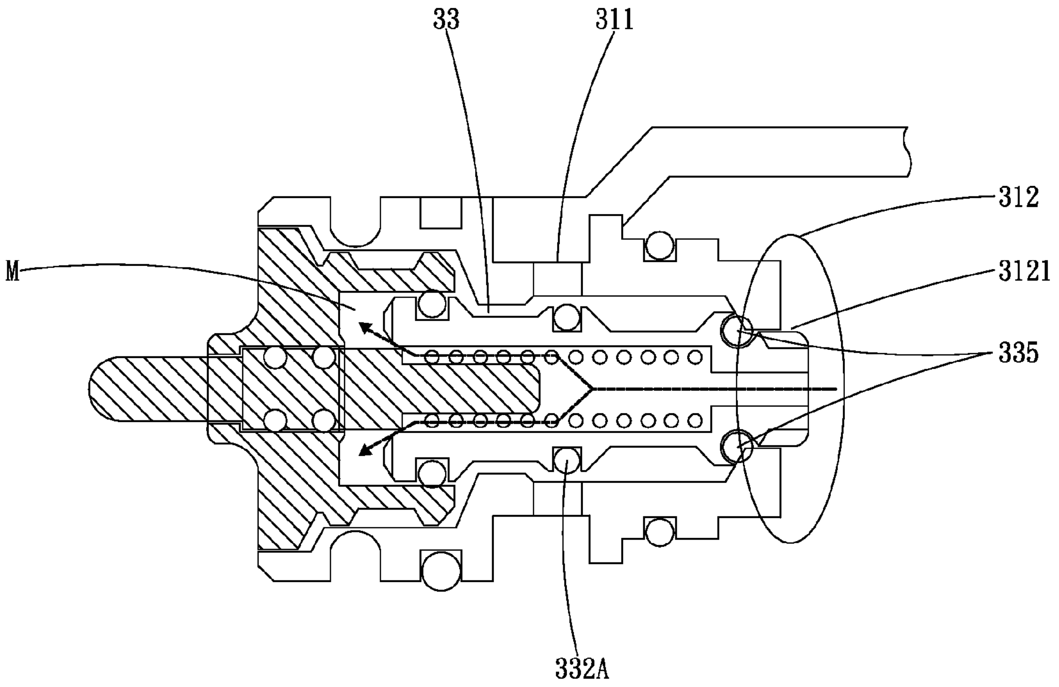
Figure 16:
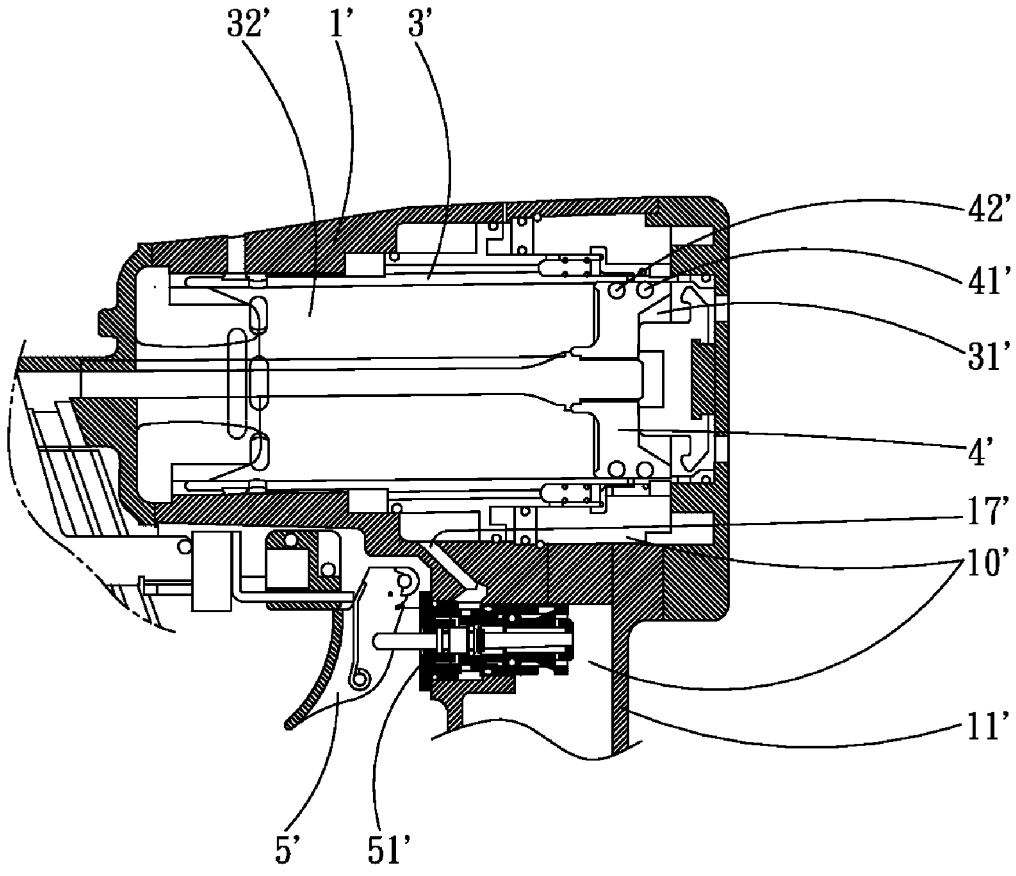
FIG. 16 is a first front view of a movable-cylinder nail gun according to a first prior-art device.
Figure 17:
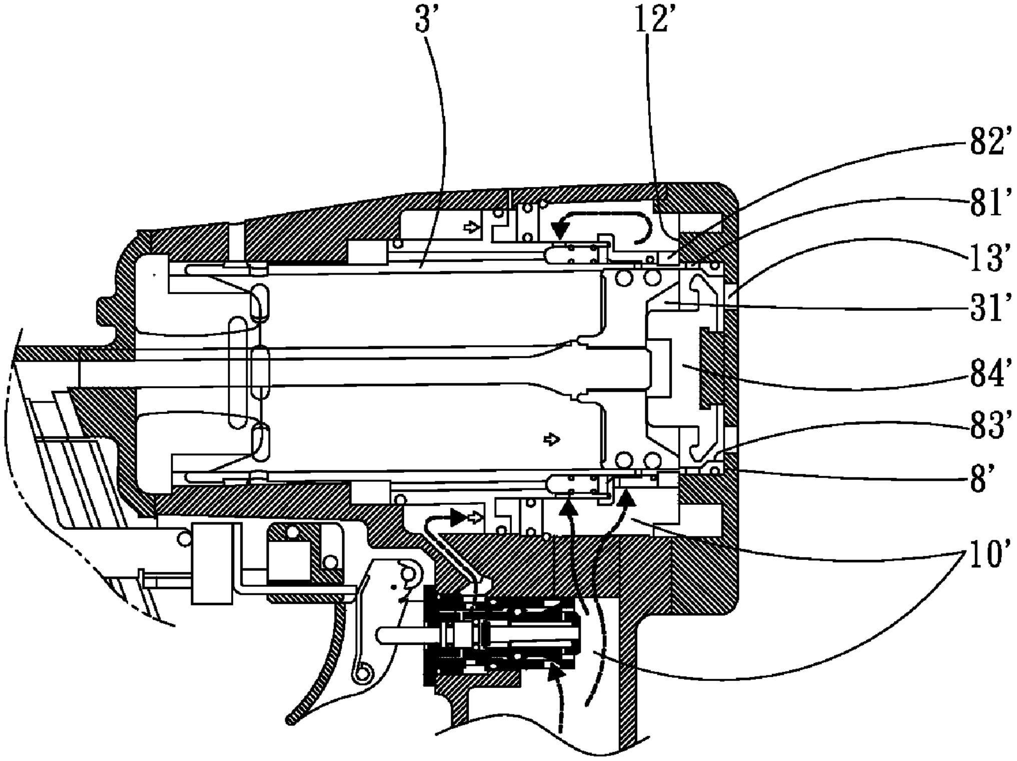
FIG. 17 is a second front view of the movable-cylinder nail gun according to the first prior-art device.
Figure 18:
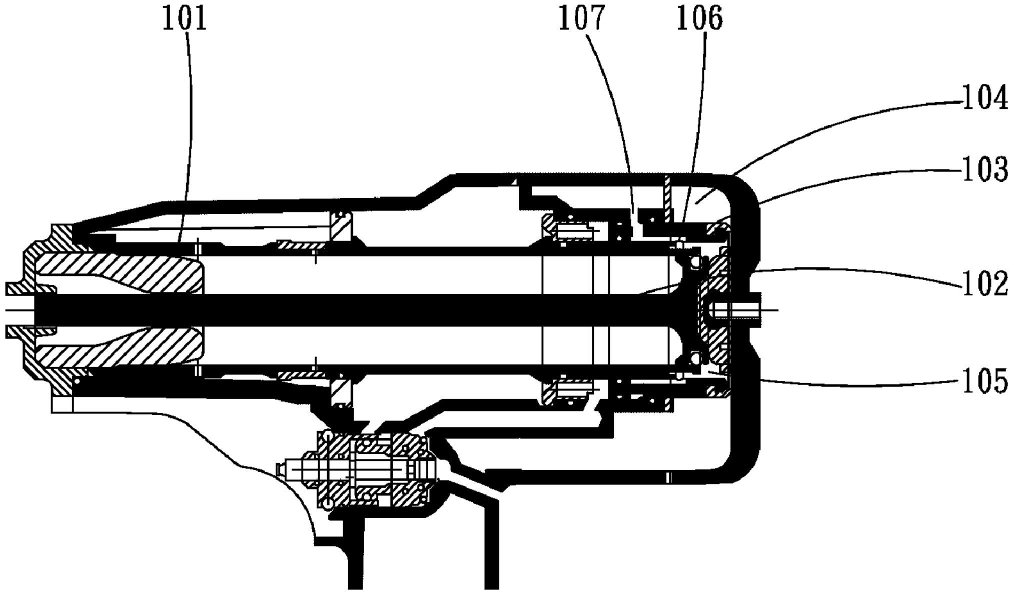
FIG. 18 is a diagram of a fixed-cylinder nail gun according to a second prior-art device.
Figure 19:
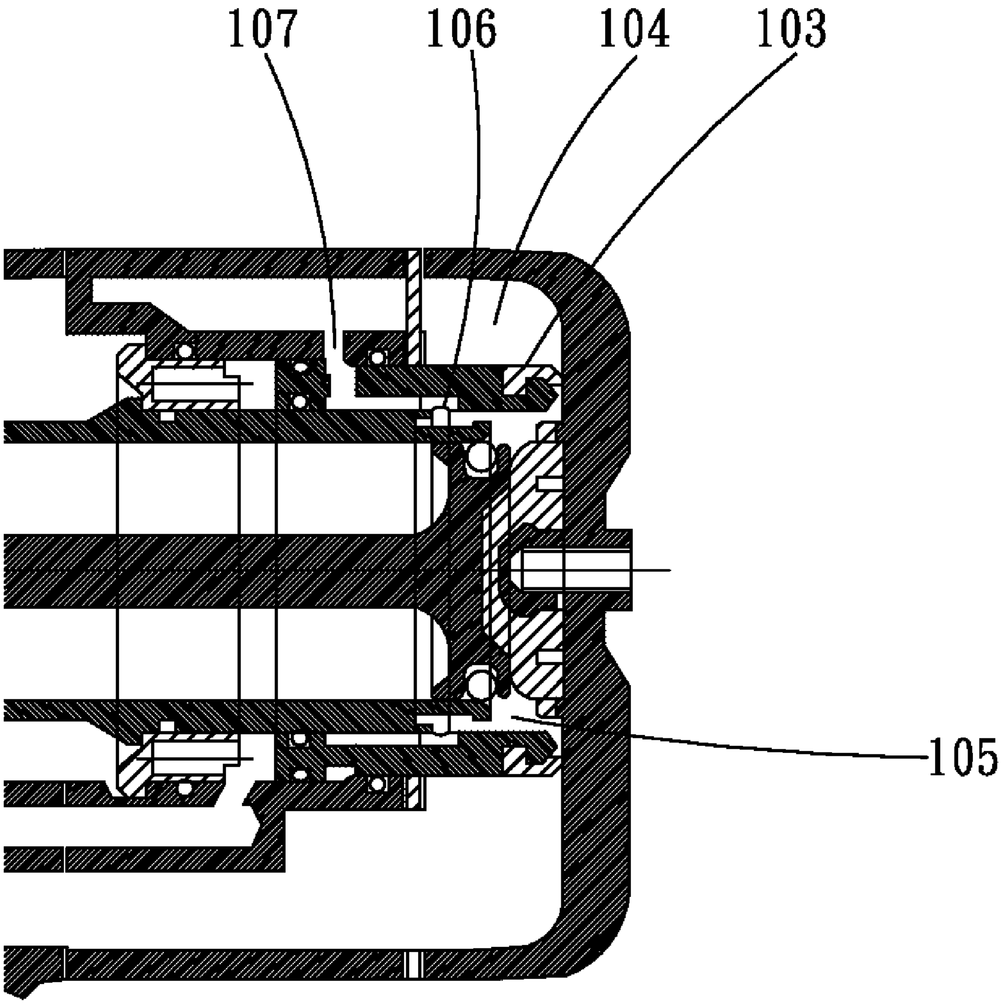
FIG. 19 is an enlarged diagram of a portion of the fixed-cylinder nail gun according to the second prior-art device.
Figure 20:
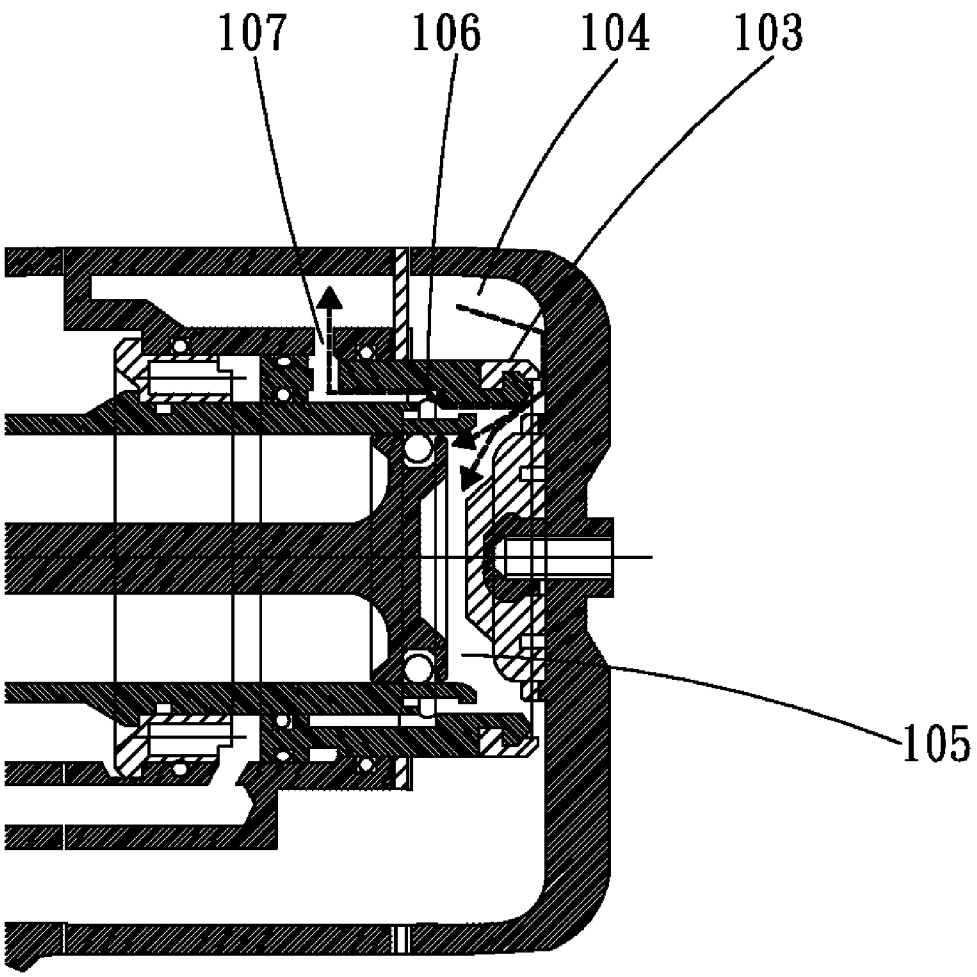
FIG. 20 is a diagram of the fixed-cylinder nail gun according to the second prior-art device in a pressurized and air escaping status.

Similarly, how individual components in the trigger device 3 cooperate with each other will be described. FIGS. 11 to 15 are diagrams of consecutive actions illustrating interactive relationships between individual components of the trigger device when the trigger axle is depressed according to the preferred embodiment of the improved pneumatic device of the present invention. For all reference numerals shown in FIGS. 11 to 15, reference may also be made to the reference numerals and locations of their counterparts shown in FIG. 10. When the handle 2 (not shown) is connected to a high-pressure pipe, high-pressure air will fill in the handle 2 and start to fill in the trigger device 3 through the first opening 331, in which case the cylinder 11 (not shown) presents the closed status, as shown in FIG. 11. When the trigger axle 32 is not depressed and the airtight gaskets 321 are located in the second opening 3131, i.e., when the end 322 of the trigger axle 32 partially enters into the enclosure 31 through the second opening 3131 of the enclosure 31, the high-pressure air flows into the trigger valve 33 through the first opening 331 of the trigger valve 33 and, through the gap between the trigger axle 32 and the inner surface of the trigger valve 33, into the space where the trigger valve 33 abuts against the hollow cavity of the enclosure 31 near the second end 313, as shown by the dashed arrows in FIG. 11. As a result, the trigger valve 33 is pushed to move from the second end 313 towards the first end 312, leaving a space M therebetween. At this point, the ring valve 335 abuts against the first opening 3121 to block entry of the high-pressure air. As shown in FIG. 12, when the trigger axle 32 is depressed and the airtight gaskets 321 move away from the second opening 3131, the high-pressure air in the space M which is no longer blocked by the airtight gaskets 321 will escape to the atmosphere via the gap between the end 322 and the inner surface of the second opening 3131, as shown by the dashed arrows in FIG. 12. As shown in FIG. 13, the trigger valve 33 is pushed by the high-pressure air in the handle 2 again to move towards the second end 313 and finally abut against the portion of the hollow cavity of the enclosure 31 near the second end 313 again. Then, as the ring valve 335 no longer abuts against the first opening 3121, the high-pressure air is allowed to enter. Meanwhile, the ring valve 332A engages with the enclosure 31 to prevent the high-pressure air from escaping and introduce the high-pressure air to flow through the side holes 311 of the enclosure 31 into the air channel 151 and further into the upper air chamber 17, as shown by the dashed arrows in FIG. 13. At this point, because of the air pressure, the cylinder 11 starts to move from the first end 1A of the body 1 towards the second end 1B of the body 1 to present the open status. Then, the high-pressure air in the main air chamber 15 enters between the nail-firing piston rod 12 and the buffer device 13 via the space W so that the nail-firing piston rod 12 moves from the first end 1A of the body 1 towards the second end 1B of the body 1 and finally into place. As shown in FIG. 14, when the trigger axle 32 is released and the airtight gaskets 321 are completely located in the second opening 3131, i.e., when the end 322 of the trigger axle 32 extends out of the enclosure 31 through the second opening 3131 of the enclosure 31, the second opening 3131 is enclosed by the airtight gaskets 321 again. As shown in FIG. 15, identical to the aforesaid conditions, the high-pressure air enters into the trigger valve 33 through the first opening 331 of the trigger valve 33 again and, through the gap between the trigger axle 32 and the inner surface of the trigger valve 33, into the space where the trigger valve 33 abuts against the hollow cavity of the enclosure 31 near the second end 313. As a result, the trigger valve 33 is pushed to move from the second end 313 towards the first end 312, leaving a space M therebetween. At this point, the ring valve 335 abuts against the first opening 3121 to block entry of the high-pressure air from the handle 2. Then the ring valve 332A disengages from the enclosure 31 to allow the high-pressure air of the upper air chamber 17 to be exhausted into the atmosphere through the air channel 151 and an opening (not shown) of the enclosure 31 near the second end 313. Meanwhile, the high-pressure air that has previously entered into the return air chamber from the second annular valve 115 leads to an increase in the pressure of the return air chamber which, plus the pressure in the original middle air chamber 17A, forces the annular rib 18A to move from the second end 1B towards the first end 1A to result in the closed status of the cylinder. As a result of this movement, the high-pressure air in the return air chamber 18 is allowed to enter into the bottom cylinder chamber 112 through the vent hole 116 to push the nail-firing piston rod 12 from the second end 1B to the first end 1A, while the air of the top cylinder chamber 111 is exhausted into the atmosphere through an exhaust channel formed by the exhaust hole 1Y and the exhaust valve 1X of the movable cylinder 11 and the exhaust hole 16.

The problem that the second prior-art device suffers from a decreased pushing efficiency gets overcome by the present invention. Referring to FIG. 5, as the movable cylinder 11 is in the open status, the high-pressure air in the main air chamber 15 pushes the nail-firing piston rod 12 to move from the first end 1A towards the second end 1B. Because the exhaust valve 1X disposed at an end of the movable cylinder 11 has closed off the exhaust channel, no high-pressure air can be exhausted from the exhaust hole 16. Therefore, no air leakage exists when the nail-firing piston rod 12 is being pushed, nor does the problem of air leakage in this route.

Accordingly, as can be known from the above description, the present invention provides an improved pneumatic device with simple construction, small volume and a novel air channel and without loss of efficiency. Through the elaborate design, the air channel is rearranged, the construction thereof is simplified and the efficiency is increased, thereby reducing the manufacturing cost and expanding the application scope owing to decrease in its volume.

What is claimed is:

1. An improved pneumatic device, comprising: a body having a hollow cavity, being adapted to define an X axis and having a first end and a second end, the body comprising: a movable cylinder, a nail-firing piston rod, and at least one exhaust hole, wherein the movable cylinder and the nail-firing piston rod are capable of reciprocating along the X axis in the body respectively by performing a forward stroke from the first end to the second end and a return stroke from the second end back to the first end, and the movable cylinder presenting an open status when completing the forward stroke and presenting a closed status when completing the return stroke, the improved pneumatic device being characterized in:

the movable cylinder having at least one exhaust hole and at least one exhaust valve disposed at an outer periphery thereof, wherein when the nail-firing piston rod has not completed the return stroke yet and the cylinder is in the closed status, the movable cylinder, close to the exhaust valve and the exhaust hole at the first end, communicates with the exhaust hole disposed near the first end and unparallel to the X axis to form an exhaust channel so as to facilitate exhausting of air; wherein the movable cylinder being disposed in the body, and having a one-way second ring valve, at least one vent hole and an annular rib;

the nail-firing piston rod being disposed in and coaxial with the movable cylinder, and adapted to reciprocate along the X axis in the movable cylinder to divide an interior of the movable cylinder into a top cylinder chamber and a bottom cylinder chamber;

the improved pneumatic device further having a pair of buffer devices, a plurality of air path structures, a return air chamber, a handle and a trigger device, therein, the pair of buffer devices being disposed near the first end of the body and near the second end of the body respectively to buffer impulsive forces generated by the nail-firing piston rod when moving to the second end and when moving back to the first end;

the plurality of air path structures further comprising:

a main air chamber being disposed at an inner periphery of the body and having an air channel;

an upper air chamber being disposed at the inner periphery of the body and communicating with the air channel; and a middle air chamber being disposed at the inner periphery of the body and communicating with the main air chamber;

the return air chamber being disposed at the inner periphery of the body and near the second end, and adapted to store high-pressure air which enters into the return air chamber through the second ring valve when the nail-firing piston rod has moved to the second end but has not started to move towards the first end, and the annular rib being disposed between the upper air chamber and the middle air chamber;

the handle defining a Y axis and being connected to the body at an orientation approximately perpendicular to the X axis of the body, and having a hollow cavity, and the main air chamber communicating with the handle; and the trigger device being disposed near the handle, and when the trigger device is depressed, the high-pressure air inside the handle is allowed to flow into the upper air chamber through the trigger device and the air channel.

2. The improved pneumatic device of claim 1, wherein a first end of the handle that connects to the body communicates with the main air chamber, while a second end of the handle opposite to the first end of the handle is provided with a high-pressure pipe connection, which is adapted to connect to a high-pressure pipe to fill the hollow cavity with high-pressure air.

3. The improved pneumatic device of claim 1, wherein the trigger device comprises:

an enclosure having a hollow cavity and comprising a plurality of airtight gaskets and at least one side hole, the side hole being adapted for allowing high-pressure air to flow into and out of the enclosure, the enclosure comprising a first end and a second end, directions of which correspond to those of the first end and the second end of the body respectively, and the first end and the second end of the enclosure having a first opening and a second opening respectively;

a trigger axle being axially accommodated in the enclosure and having an end and at least two airtight gaskets, wherein the end partially protrudes out of and is capable of retracting into and extending out of the second opening of the enclosure; and a trigger valve being axially accommodated in the enclosure and having a hollow cavity, the trigger valve comprising a first opening, a second opening and a return spring, the trigger axle being accommodated into the trigger valve through the second opening and is coaxial with the trigger valve, the trigger valve having a plurality of ring valves on an outer surface thereof, the trigger valve partially protruding out of and being capable of retracting into and extending out of the first opening of the enclosure, the first opening being provided for high-pressure air to flow therethrough, and the return spring being disposed around an end of the trigger axle opposite to the end that protrudes out of the second opening of the enclosure and abutting against an inner surface of the trigger valve to assist in returning of the trigger axle after being partially retracted into the trigger valve;

wherein, through cooperation of the enclosure, the trigger axle and the trigger valve in the piston movement, the cylinder moves between the open status and the subsequent closed status in the body to accomplish the reciprocating movement of the movable cylinder and the nail-firing piston rod.

4. The improved pneumatic device of claim 1, further comprising:

a tubular part being disposed on the outside of the second end of the body and coaxial with the movable cylinder.

5. The improved pneumatic device of claim 3, wherein the tubular part is a barrel of a nail gun.

* * * * *